United States Patent
Kochi et al.

(10) Patent No.: US 8,154,854 B2
(45) Date of Patent: Apr. 10, 2012

(54) SOLID ELECTROLYTIC CAPACITOR AND METHOD OF MANUFACTURING THE SAME

(75) Inventors: Ayumi Kochi, Osaka (JP); Seiji Takagi, Osaka (JP); Shigetaka Furusawa, Kyoto (JP); Hiroyuki Matsuura, Shiga (JP); Tatsuji Aoyama, Yamaguchi (JP); Yukiya Shimoyama, Yamaguchi (JP)

(73) Assignee: Panasonic Corporation, Osaka (JP)

( * ) Notice: Subject to any disclaimer, the term of this patent is extended or adjusted under 35 U.S.C. 154(b) by 284 days.

(21) Appl. No.: 12/596,513

(22) PCT Filed: Mar. 6, 2009

(86) PCT No.: PCT/JP2009/001024
§ 371 (c)(1),
(2), (4) Date: Oct. 19, 2009

(87) PCT Pub. No.: WO2009/113285
PCT Pub. Date: Sep. 17, 2009

(65) Prior Publication Data
US 2010/0118470 A1    May 13, 2010

(30) Foreign Application Priority Data

Mar. 10, 2008 (JP) .................. 2008-058938
Mar. 10, 2008 (JP) .................. 2008-058939
Jun. 23, 2008 (JP) .................. 2008-162908

(51) Int. Cl.
*H01G 4/06* (2006.01)
*H01G 5/013* (2006.01)

(52) U.S. Cl. ............................. 361/524; 29/25.03
(58) Field of Classification Search .............. 361/523, 361/524, 528–530; 29/25.03
See application file for complete search history.

(56) References Cited

U.S. PATENT DOCUMENTS

| | | | |
|---|---|---|---|
| 4,934,033 A | * | 6/1990 | Harakawa et al. .......... 29/25.03 |
| 6,208,503 B1 | | 3/2001 | Shimada et al. |

FOREIGN PATENT DOCUMENTS

| | | |
|---|---|---|
| JP | 10-340829 | 12/1998 |
| JP | 2003-297684 A | 10/2003 |
| JP | 2007-103499 A | 4/2007 |

OTHER PUBLICATIONS

International Search Report for International Application No. PCT/JP2009/001024), May 26, 2009, Panasonic Corporation.
Chinese Office Action for 200980000295.X, Jan. 26, 2011.
Translation of JP 2003-297684 A, Oct. 17, 2003, Nippon Chemicon Corp.

* cited by examiner

*Primary Examiner* — Eric Thomas
(74) *Attorney, Agent, or Firm* — RatnerPrestia

(57) ABSTRACT

A solid electrolytic capacitor includes a positive electrode foil made of metal, a dielectric oxide layer provided on a surface of the positive electrode foil, a separator provided on the dielectric oxide layer, a solid electrolyte layer made of conductive polymer impregnated in the separator, a negative electrode foil facing the dielectric oxide layer across the solid electrolyte layer, and a phosphate provided on the dielectric oxide layer. This solid electrolytic capacitor reduces a leakage current.

11 Claims, 4 Drawing Sheets

SOLID ELECTROLYTIC CAPACITOR AND METHOD OF MANUFACTURING THE SAME

This Application is a U.S. National Phase Application of PCT International Application PCT/JP2009/001024.

TECHNICAL FIELD

The present invention relates to a solid electrolytic capacitor and a method of manufacturing the capacitor.

BACKGROUND ART

As electronic devices operate at higher speeds at higher frequencies, electrolytic capacitors used in power supply lines of CPUs are required to have noise reduction performance and quick transient response over wide bandwidths from a low frequency to a high frequency of about 1 MHz to 1 GHz, and to have large capacitances and low impedance.

Roll type solid electrolytic capacitors that easily provide larger capacitance than capacitors including plural laminated electrode foils have been put in the market. Roll type solid electrolytic capacitors are made by winding a positive electrode foil and a negative electrode foil laminated with a separator in between. Such solid electrolytic capacitors have superior high-frequency characteristics in addition to long life time and temperature characteristics, and accordingly, are widely adopted in power supply circuits of personal computers.

FIG. 4 is a partially cutaway perspective view of a conventional electrolytic capacitor 501 described in Patent Documents 1 and 2. Positive electrode foil 101 made of aluminum foil has a surface roughened by etching. A dielectric oxide layer is formed by anodizing the surface. Negative electrode foil 102 is made of aluminum foil. Capacitor element 105 is formed by winding positive electrode foil 101 and negative electrode foil 102 with insulating separator 103 in between. Solid electrolyte layer 104 is made of conductive polymer impregnated in separator 103. Positive electrode lead wire 106 and negative electrode lead wire 107 are joined to positive electrode foil 101 and positive electrode foil 102, respectively, and are drawn to outside. Case 108 accommodates capacitor element 105. Case 108 is made of aluminum and has a cylindrical shape having a bottom. Sealing member 109 made of resin vulcanized butyl rubber has holes 109A and 109B which positive electrode lead wire 106 and negative electrode lead wire 107 pass through, respectively, and seals an opening of case 108.

Upon a voltage being applied to, solid electrolytic capacitor 501 may cause a leakage current generating heat, hence shortening its life time.

Patent Document 1: JP10-340829A
Patent Document 2: JP2007-103499

SUMMARY OF THE INVENTION

A solid electrolytic capacitor includes a positive electrode foil made of metal, a dielectric oxide layer provided on a surface of the positive electrode foil, a separator provided on the dielectric oxide layer, a solid electrolyte layer made of conductive polymer impregnated in the separator, a negative electrode foil facing the dielectric oxide layer across the solid electrolyte layer, and a phosphate provided on the dielectric oxide layer.

This solid electrolytic capacitor reduces a leakage current.

REFERENCE NUMERALS

1 Positive Electrode Foil
1A Surface
1B Dielectric Oxide Layer
1C Electrolyte
2 Negative Electrode Foil
3 Separator
4 Solid Electrolyte Layer
4A Conductive Polymer

DETAIL DESCRIPTION OF PREFERRED EMBODIMENT

Figure 1:
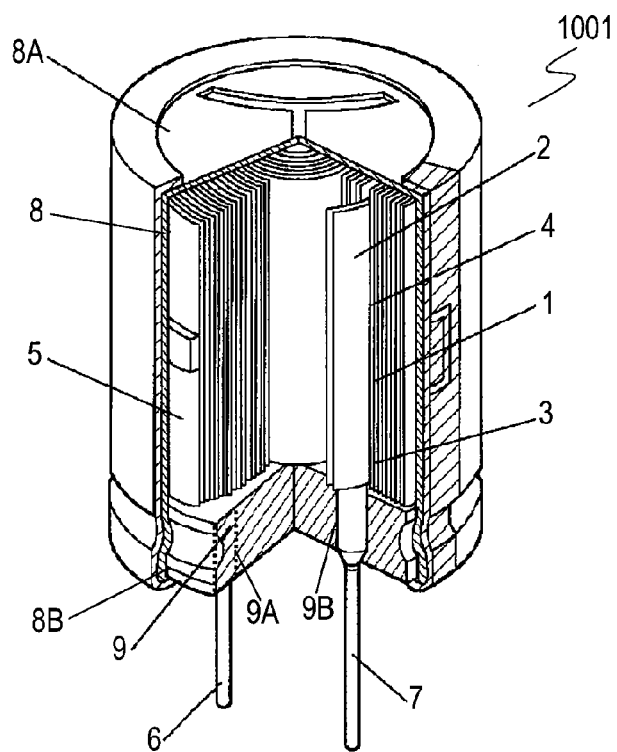
FIG. 1 is a partially cutaway perspective view of a solid electrolytic capacitor in accordance with an exemplary embodiment of the present invention.
Figure 2:
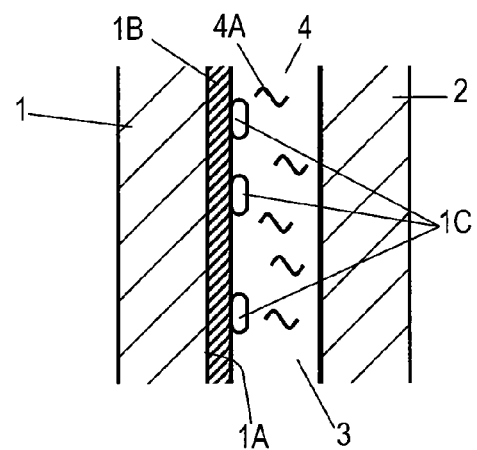
FIG. 2 is a sectional view of the solid electrolytic capacitor in accordance with the embodiment.

FIGS. 1 and 2 are partially cutaway perspective view and sectional view of solid electrolytic capacitor 1001 according to an exemplary embodiment of the present invention, respectively. Positive electrode foil 1 made of metal, such as aluminum, has surface 1A roughened by etching. Dielectric oxide layer 1B is provided on surface 1A by anodizing surface 1A. Separator 3 having an insulating property is provided on dielectric oxide layer 1B. Negative electrode foil 2 made of metal, such as aluminum, is provided on separator 3. That is, negative electrode foil 2 faces dielectric oxide layer 1B across separator 3. Positive electrode foil 1, dielectric oxide layer 1B, separator 3, and negative electrode foil 2 are thus stacked and wound, providing capacitor element 5. Conductive polymer 4A impregnated in separator 3 constitutes solid electrolyte layer 4. That is, negative electrode foil 2 faces dielectric oxide layer 1B across solid electrolyte layer 4. Electrolyte 1C made of phosphate is provided on dielectric oxide layer 1B. Positive electrode lead wire 6 and negative electrode lead wire 7 are joined with positive electrode foil 1 and negative electrode foil 2, respectively. Case 8 made of aluminum has bottom 8A, and has a cylindrical shape having opening 8B. Case 8 accommodates capacitor element 5 therein such that lead wires 6 and 7 are drawn out from opening 8B. Sealing member 9 made of resin galvanized butyl rubber has holes 9A and 9B which lead wires 6 and 7 pass through, respectively, and seals opening 8B of case 8.

A method of manufacturing solid electrolytic capacitor 1001 will be described below.

First, dielectric oxide layer 1B is formed on surface 1A by anodizing surface 1A of positive electrode foil 1. Positive electrode lead wire 6 is joined to positive electrode foil 1. Negative electrode lead wire 7 is joined to negative electrode foil 2. Then, positive electrode foil 1, separator 3, and negative electrode foil 2 are stacked such that dielectric oxide layer 1B and negative electrode foil 2 face each other across separator 3 in between, and are wound with a winding machine, providing capacitor element 6. When stacked positive electrode foil 1, separator 3, and negative electrode foil 2 are wound, a crack or damage may be caused on dielectric oxide layer 1B.

Then, while capacitor element 5 is immersed in an anodizing solution, a voltage is applied between lead wires 6 and 7 to form a dielectric oxide layer on an end surface of positive electrode foil 1 by anodizing a portion of surface 1A exposed due to the crack or damage of dielectric oxide layer 1B. The anodizing solution contains phosphate as electrolyte. According to this embodiment, the anodizing solution contains ammonium dihydrogen phosphate as the electrolyte. Then, capacitor element 5 is dried by heating.

Then, capacitor element 5 is immersed into a polymerizing solution to impregnate conductive polymer 4A into separator 3, providing solid electrolyte layer 4.

Then, capacitor element 5 is accommodated in case 8, and sealing member 9 is placed in opening 8B to seal opening 8B by shrinking the case, thereby providing solid electrolytic capacitor 1001.

In a conventional method of manufacturing a solid electrolytic capacitor, capacitor element 5 is immersed in the anodizing solution to restore the crack or damage of dielectric oxide layer 1B, and then, the anodizing solution is removed from capacitor element 5 by rinsing element with water or cleaning fluid, and capacitor element 5 is dried. In the method of manufacturing solid electrolytic capacitor 1001 in accordance with the embodiment, after element 5 is immersed in the anodizing solution to restore the crack or damage of dielectric oxide layer 1B, capacitor element 5 is dried without the rinsing to cause electrolyte 1C (phosphate) in the anodizing solution to remain on dielectric oxide layer 1B.

Thus, this method can eliminate the process of rinsing capacitor element 5 of solid electrolytic capacitor 1001. Even after solid electrolyte layer 4 is formed, a crack or damage of dielectric oxide layer 1B may be caused due to physical stress applied to capacitor element 5. A voltage is applied to lead wires 6 and 7 after solid electrolytic capacitor 1001 is completed, the phosphate, electrolyte, that remains on surface 1A of positive electrode foil 1 anodizes a portion of surface 1A of positive electrode foil 1 which is exposed due to the crack or damage on dielectric oxide layer 1B, and forms a dielectric oxide layer and restores the crack or damage occurring on dielectric oxide layer 1B. This operation reduces a leakage current caused by the crack or damage on dielectric oxide layer 1B, thus providing the solid electrolytic capacitor with high reliability.

According to this embodiment, capacitor element 5 includes positive electrode foil 1, negative electrode foil 2, and separator 3 that are wound. The solid electrolytic capacitor in accordance with the embodiment can include a capacitor element including positive electrode foil 1 and negative electrode foil 2 facing each other across separator 3 in between while positive electrode foil 1, negative electrode foil 2, and separator 3 are not wound.

Both of positive electrode foil 1 and negative electrode foil 2 of solid electrolytic capacitor 1001 are made of aluminum. Negative electrode foil 2 of capacitor element 5 in accordance with the embodiment invention can be made of conductive material, such as nickel, titanium, or carbon, providing the same effects.

The electrolyte in the anodizing solution in accordance with the embodiment is phosphate, and is preferably ammonium dihydrogen phosphate. This anodizing solution has a high resistance to water and is also used to form oxide layer 1B on surface 1A of positive electrode foil 1. Therefore, this solution does will not affect solid electrolyte layer 4 of the completed solid electrolytic capacitor 1001.

In capacitor element 5, phosphate remains preferably by the amount ranging from 0.5 µg to 50 µg per 1 $cm^2$ of positive electrode foil 1. If the amount of the remaining phosphate is smaller than 0.5 µg, the remaining phosphate cannot anodize surface 1A of positive electrode foil 1 sufficiently, thus preventing dielectric oxide layer 1B from being restored sufficiently. If the amount of the remaining phosphate is greater than 50 µg, the remaining phosphate may disturb the polymerization of conductive polymer 4A of solid electrolyte layer 4, thus preventing solid electrolyte layer 4 from being formed preferably.

In the case that the phosphate of the electrolyte in the anodizing solution is ammonium dihydrogen phosphate, the amount of the phosphate remaining in capacitor element 5 is measured by the following method. First, the relationship between the concentration of the anodizing solution in aqueous solution containing the anodizing solution and an electrical conductivity of the aqueous solution is previously measured to prepare a calibration curve showing the relationship between the electrical conductivity and the concentration of the aqueous solution of the anodizing solution. Capacitor element 5 is disassembled after dried. Then, positive electrode foil 1 is immersed in a predetermined amount of water so as to dissolve of the anodizing solution attached to foil 1 in the water, thereby preparing an extraction solution of the anodizing solution.

Then, the electrical conductivity of the extraction solution is measured to find the concentration of the anodizing solution in the extraction solution based on the calibration curve. Then, the amount of the phosphate is calculated based on the concentration of the phosphate in anodizing solution and the volume of the extraction solution.

Then, the amount of phosphate per unit area of positive electrode foil 1 is calculated based on the calculated amount of phosphate and the area of positive electrode foil 1.

A sample of Example 1 of the solid electrolytic capacitor in accordance with the embodiment was prepared. First, dielectric oxide layer 1B was formed on surface 1A of positive electrode foil 1 by anodizing the surface with an anodizing voltage of 12V. Then, capacitor element 1 was prepared by the above method. Then, in order to restore a crack or damage of dielectric oxide layer 1B inside capacitor element 1, while capacitor element 1 was immersed in 1.0 wt. % of an aqueous solution of ammonium dihydrogen phosphate at a temperature of 70° C., a dielectric oxide layer was formed by applying a voltage, such as 11V, not exceeding the voltage (12V) of the anodizing between lead wires 6 and 7. Then, capacitor element 1 was taken out from the aqueous solution of ammonium dihydrogen phosphate and dried by heating at a temperature ranging from 100° C. to 180° C. for about 30 minutes. Then, ethylene-dioxy-thiophene (EDOT) or EDOT solution was impregnated in capacitor element 1. Then, butanol solution of ferric oxide of paratoluene sulphonic acid was impregnated in capacitor element 1. Then, capacitor element 1 was taken out from the butanol solution and heated at a temperature ranging from 20° C. to 180° C. for not shorter than 30 minutes, thereby forming the conductive polymer on separator 3. Capacitor element 1 was then accommodated in case 8, and sealing member 9 was put into opening 8B of the case. Then, opening 8B of case 8 was sealed by a curling process. Capacitor element 1 was then subjected to an aging process in which a DC voltage of 6.3V was applied between lead wires 6 and 7 at an ambient temperature of 105° C. continuously for one hour, thereby preparing the sample of Example 1 of solid electrolytic capacitor 1 according to the embodiment having a diameter of 10 mm and a height of 10 mm. The rated voltage of the sample of example 1 was 6.3V.

A sample of Example 2 of solid electrolytic capacitor 1 having a rated voltage of 25V was manufactured by a method similar to the above method. For the sample of Example 2, the anodizing voltage for forming dielectric oxide layer 1B was 50V. The voltage for restoring dielectric oxide layer 1B after making capacitor element 1 was 48V. The voltage of the aging process after sealing case 8 was 25V.

Samples of Comparative Examples 1 and 2 with rated voltages of 6.3V and 25V, respectively, were prepared by removing aqueous solution of ammonium dihydrogen phosphate by rinsing a capacitor element with water for 10 minutes after restoring the dielectric oxide layer. Further, samples of Comparative Examples 3 and 4 with rated voltages of 6.3V and 25V, respectively, were prepared without restoring the dielectric oxide layer.

Figure 3A:
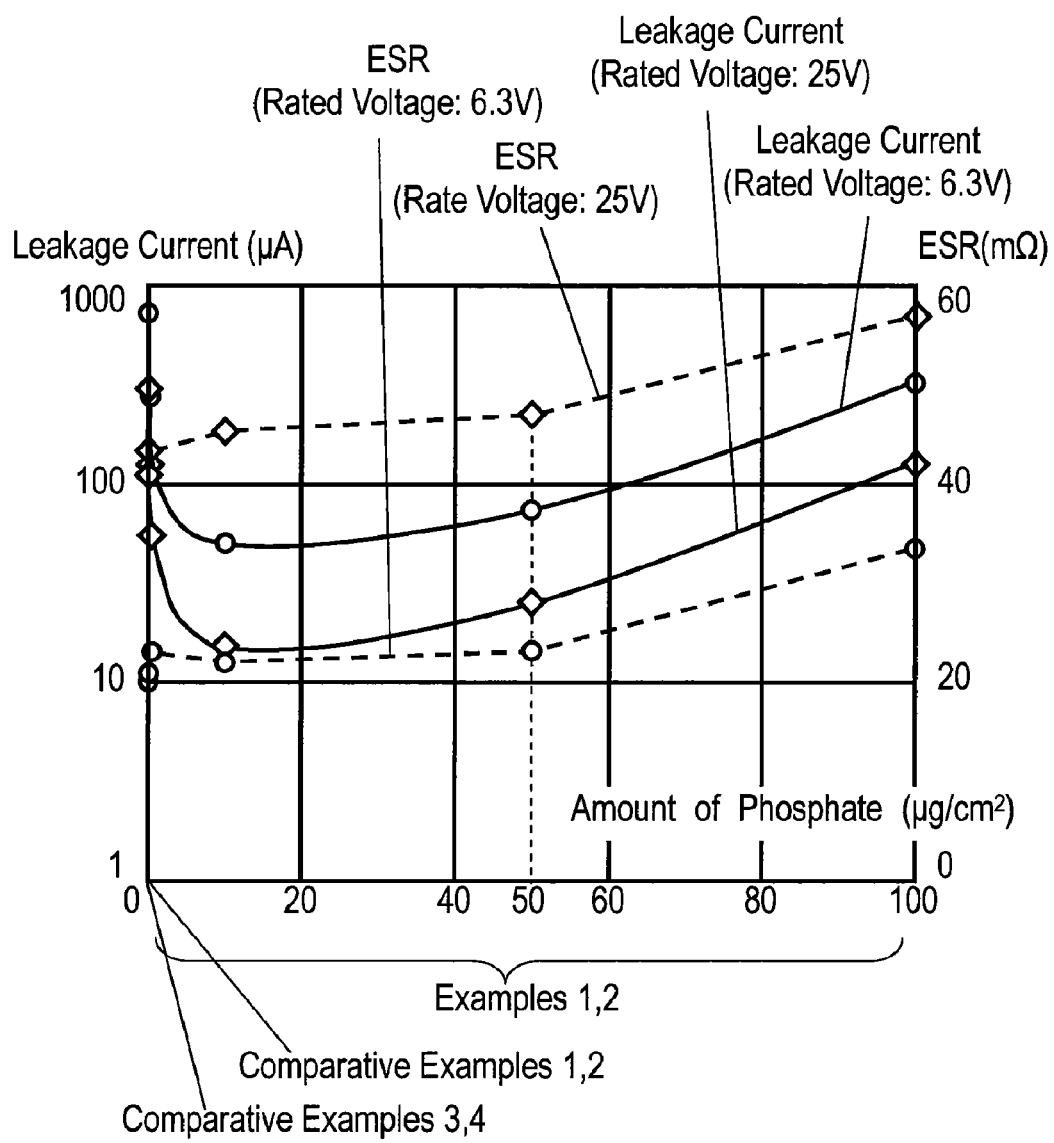
FIG. 3A shows evaluation results of the solid electrolytic capacitor in accordance with the embodiment.
Figure 3B:
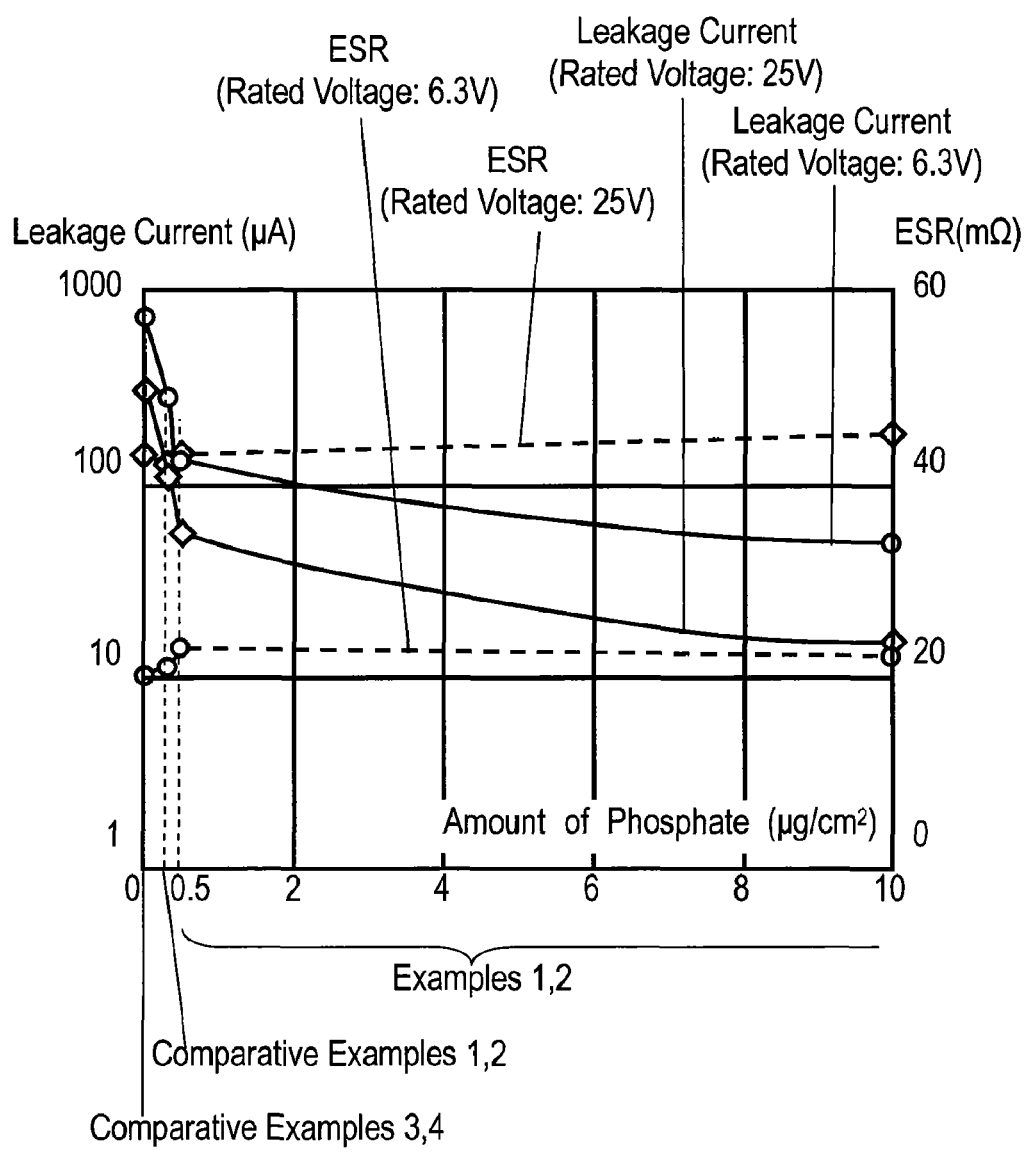
FIG. 3B shows evaluation results of the solid electrolytic capacitor in accordance with the embodiment.
Figure 4:
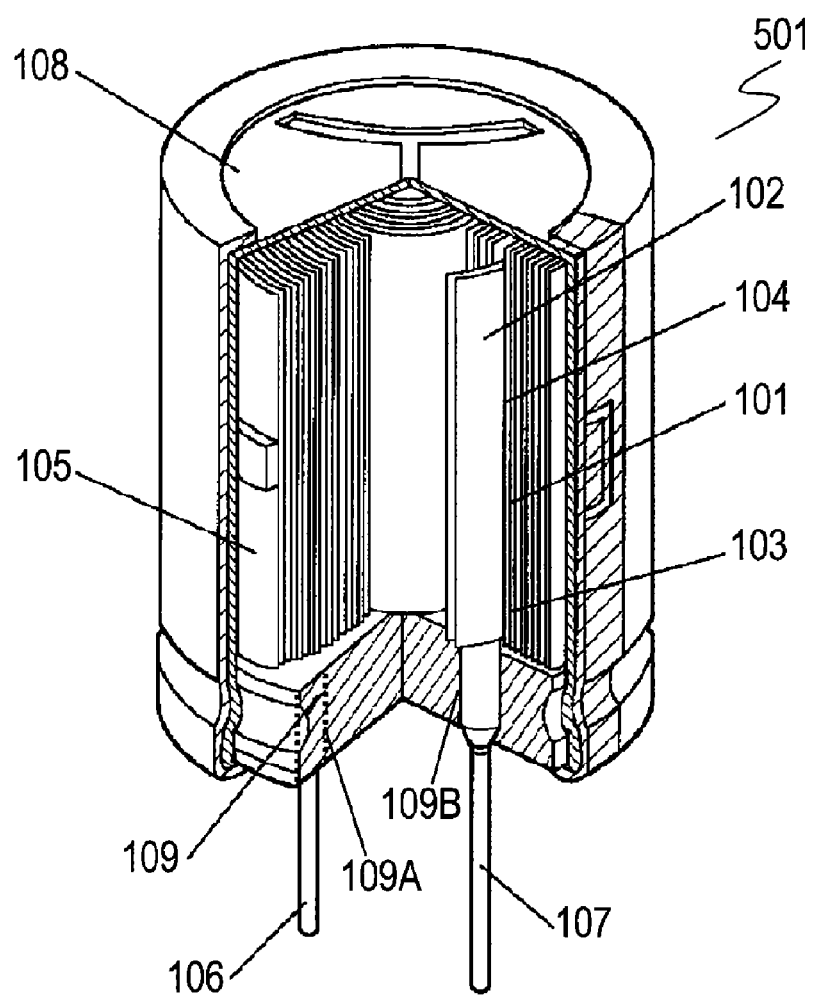
FIG. 4 is a partially cutaway perspective view of a conventional solid electrolytic capacitor.

Leakage currents were measured two minutes after applying a DC voltage of 6.3V to the samples of Examples 1 and 2 and Comparative Examples 1 to 4. An equivalent series resistance (ESR) of each of the samples was measured at 100 kHz. The amounts of ammonium dihydrogen phosphate remaining in the samples of Examples 1 and 2 were measured by the above method. FIGS. 3A and 3B show measurement results of the leakage current and the ESR of each of the samples of Examples 1 and 2 as a function of the amount of ammonium dihydrogen phosphate. FIG. 3B shows the measurement results while enlarging the horizontal axis of FIG. 3A. As shown in FIG. 3A, if the amount of ammonium dihydrogen phosphate is larger than 50 µg per 1 $cm^2$ of surface 1A of positive electrode foil 1, the leakage current and the ESR increase. As shown in FIG. 3B, if the amount of ammonium dihydrogen phosphate is smaller than 0.5 µg per 1 $cm^2$ of surface 1A of positive electrode foil 1, the leakage current also increases. Thus, the phosphate remains by the amount ranging preferably from 0.5 µg to 50 µg per 1 $cm^2$ of surface 1A of positive electrode foil 1.

According to the embodiment, the conductive polymer constituting solid electrolyte layer 4 is formed by polymerizing thiophene and its derivative with oxidizing agent consisting of transition metal salt, thereby reducing the leakage current effectively Solid electrolytic capacitor 1001 includes case 8 made of aluminum accommodating capacitor element 5, but can include package resin covering capacitor element 5 instead of case 8.

INDUSTRIAL APPLICABILITY

A solid electrolytic capacitor according to the present invention reduces a leakage current, and has high reliability, hence being useful for various electronic devices.

The invention claimed is:

1. A solid electrolytic capacitor comprising:
   a positive electrode foil made of metal and having a surface;
   a dielectric oxide layer provided on said surface of said positive electrode foil;
   a separator having an insulating property and provided on said dielectric oxide layer;
   a solid electrolyte layer made of conductive polymer impregnated in said separator;
   a negative electrode foil facing said dielectric oxide layer across said solid electrolyte layer; and
   a phosphate provided on said dielectric oxide layer,
   wherein said phosphate is provided by an amount ranging from of 0.5 µg to 50 µg per 1 $cm^2$ of said positive electrode foil.

2. The solid electrolytic capacitor according to claim 1, wherein said phosphate is ammonium dihydrogen phosphate.

3. The solid electrolytic capacitor according to claim 1, wherein said solid electrolyte layer contains conductive polymer formed by polymerizing thiophene and its derivative with oxidizing agent consisting of transition metal salt.

4. The solid electrolytic capacitor according to claim 1, wherein the phosphate is provided on said dielectric oxide layer and between the dielectric oxide layer and the separator.

5. A method of manufacturing a solid electrolytic capacitor, comprising:
   forming a dielectric oxide layer by anodizing a surface of a positive electrode foil made of metal;
   stacking the positive electrode foil, a separator having an insulating property, and a negative electrode foil made of metal such that the negative electrode foil faces the dielectric oxide layer across the insulating separator;
   forming a capacitor element by winding the positive electrode foil, the separator, and the negative electrode foil after said stacking the positive electrode foil, the separator, and the negative electrode foil;
   restoring the dielectric oxide layer by immersing the capacitor element into an anodizing solution containing electrolyte adapted to anodize the positive electrode foil;
   drying the capacitor element after said restoring the dielectric oxide layer so that the electrolyte remains on the positive electrode foil; and
   forming a solid electrolyte layer by impregnating conductive polymer in the separator,
   wherein said electrolyte is provided by an amount ranging from of 0.5 µg to 50 µg per 1 $cm^2$ of said positive electrode foil.

6. The method according to claim 5, wherein the electrolyte is phosphate.

7. The method according to claim 6, wherein the electrolyte is ammonium dihydrogen phosphate.

8. The method according to claim 5, wherein said forming the solid electrolyte layer comprises impregnating, into the separator, conductive polymer obtained by polymerizing thiophene and its derivative with oxidizing agent consisting of transition metal salt.

9. The method according to claim 5, wherein the capacitor element is not rinsed from a time after said restoring the dielectric oxide layer.

10. The method according to claim 9, wherein the capacitor element is not rinsed from a time after said restoring the dielectric oxide layer to a time after said drying the capacitor element.

11. The method according to claim 5, wherein the phosphate is provided on said dielectric oxide layer and between the dielectric oxide layer and the separator.

* * * * *